(12) United States Patent
Ikeda

(10) Patent No.: US 7,042,474 B2
(45) Date of Patent: May 9, 2006

(54) INTERNET MOVING IMAGE LINKING SYSTEM AND LINK RECOGNITION METHOD

(75) Inventor: Katsuji Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 10/028,913

(22) Filed: Dec. 28, 2001

(65) Prior Publication Data
US 2002/0089524 A1    Jul. 11, 2002

(30) Foreign Application Priority Data
Jan. 10, 2001    (JP)    ............... 2001-003101

(51) Int. Cl.
    *G09G 5/00* (2006.01)
(52) U.S. Cl. .................. 345/672; 345/473; 715/719
(58) Field of Classification Search ............... 345/760, 345/744, 672, 473, 474, 745; 709/217; 715/716, 715/719, 723, 726, 744, 760; 348/473
See application file for complete search history.

(56) References Cited

U.S. PATENT DOCUMENTS

| 5,684,715 | A | * | 11/1997 | Palmer ...................... 348/473 |
| 5,774,664 | A | * | 6/1998 | Hidary et al. ................ 725/110 |
| 5,774,666 | A | * | 6/1998 | Portuesi ...................... 725/110 |
| 5,918,012 | A | * | 6/1999 | Astiz et al. .................. 709/217 |
| 5,970,504 | A | * | 10/1999 | Abe et al. ................ 715/501.1 |
| 6,175,840 | B1 | * | 1/2001 | Chen et al. .............. 715/501.1 |
| 6,570,586 | B1 | * | 5/2003 | Kamen et al. .............. 345/719 |

FOREIGN PATENT DOCUMENTS

| JP | 10-187402 A | 7/1998 |
| JP | H11-195042 A | 7/1999 |
| JP | H11-328433 A | 11/1999 |
| JP | 2000-287183 A | 10/2000 |

OTHER PUBLICATIONS

Hideaki Fujimoto, Nobuo Yoshioka and Kōichi Ōmura: Clickable movies and their authoring tools. Jōhō shori gakkai kenkyū hōkoku [Journal of Information Processing] (200-HI-91).

* cited by examiner

Primary Examiner—Matthew Luu
(74) Attorney, Agent, or Firm—Sughrue Mion, PLLC

(57) ABSTRACT

An internet moving image linking system is provided that can reduce link information necessary for the related information in a moving image linkage. The internet moving image linking system includes a server and a user terminal. The server has means for judging the presence or absence of a link destination based on point time information and point coordinate information each transmitted from the user terminal.

6 Claims, 2 Drawing Sheets

INTERNET MOVING IMAGE LINKING SYSTEM AND LINK RECOGNITION METHOD

BACKGROUND OF THE INVENTION

The present invention relates to an internet moving image linking system. More particularly, the present invention relates to an internet moving image linking system and a link recognition method, each of which is capable of reducing link information necessary for the related information in a moving image linkage.

Nowadays, based on the use of computers, many people are using hypertext applications by clicking, by means of a mouse, a hot link within a World Wide Web (WWW) home page on the Internet. The hot link means that an image area wherein there are active hyperlinks.

The Hypertext technology is being broadly utilized in text documents and image media and, particularly, has begun to be used for animations and videos. The internet moving image linking system is being progressively developed in which the point and click functions of Hypertext are introduced into full moving-image videos.

However, the conventional moving image linking system cannot link with related information varied with the time or by the operation of a moving image. In such a system, when the time or operation of a moving image varies, the linkage with the same related information can be merely set. Even when linkage is set every time or shape of a moving image, the moving image generally varies its shape from time to time. Therefore, the problem is that an enormous volume of information is required to store link information every time or shape.

JP-A No. 187402/1998 discloses the method for showing the position of a time-dependent video hot link. This method can indicate the position of a time-dependent video hot link to a user, but cannot solve the above-described problems.

For that reason, the internet time-varying image link system has been long waited that can reduce link information necessary for the related information even when a linkage is established with complicated moving images such as movies.

SUMMARY OF THE INVENTION

The present invention is made to solve the above-mentioned problems.

An object of the present invention is to provide an internet moving image linking system capable of reducing link information necessary for the related information in a moving image linkage.

In order to solve the above-described problems, an internet moving image linking system comprises a server and a user terminal. The server includes means for judging the presence or absence of a link destination based on point time information and point coordinate information each transmitted from the user terminal.

In the above-described configuration, the server judges the presence or absence of a link destination based on point time information and point coordinate information transmitted from a user terminal. For that reason, the server does not require the link information every time and can reduce the volume of information to be stored. Even when a moving-image linkage is performed to the complicated screen such as a movie, the link information necessary for each time or each shape can be reduced.

Moreover, according to another aspect of the present invention, an internet moving image linking system comprises a server and a user terminal. The server includes a moving image distributor for distributing a moving image to the user terminal; and a link destination recognizer for recognizing a link destination based on point time information and point coordinate information each transmitted from the user terminal.

In such a configuration, the server has a link destination recognizer that recognizes a link destination based on point time information and point coordinate information transmitted from a user terminal. For that reason, the server does not require the link information every time and can reduce the volume of information to be stored. Even when a moving-image linkage is performed to the complicated screen such as a movie, the link information necessary for each time or each shape can be reduced.

According to another aspect of the present invention, an internet moving image linking system comprises a server and a user terminal. The server includes a moving image distributor for distributing a moving image to the user terminal; an image detector for detecting, based on point time information transmitted from the user terminal, a static image at a corresponding time; and an image recognizer for recognizing an image based on point coordinate information transmitted from the user terminal and based on the static image detected by the image detector.

In such a configuration, the server has an image detector and an image recognizer. For that reason, the server does not require the link information every time and can reduce the volume of information to be stored. Even when a moving-image linkage is performed to the complicated screen such as a movie, the link information necessary for each time or each shape can be reduced.

In the above-described internet moving image linking system, the server comprises a link point storage for storing link point information; a link point detector for detecting a link point at a point time based on point time information and link point information transmitted from the user terminal; and a link point comparator for comparing the coordinate of an image recognized by the image recognizer with the coordinate of a link point detected by the link point detector.

In such a configuration, the server has the link point comparator that compares the coordinate of an image recognized by the image recognizer with a link point comparator that coordinate of a link point detected by the link point detector. Therefore, even when a moving-image linkage is performed to the complicated screen such as a movie, the link information for each time or each shape necessary for the related information can be reduced.

In the above-described internet moving image linking system, the user terminal comprises a moving image reproducer for reproducing a moving image distributed from the server; a point designator for designating a specific point within a moving image; a point coordinate information transmitter for transmitting point coordinate information designated by the point designator to the server; and a point time information transmitter for transmitting point time information regarding a point designated by the point designator, to the server.

In such a configuration, a user can specify a specific point within a moving image so that information about a specific link destination can be easily acquired.

In the above-described internet moving image linking system, the server comprises means for transmitting, when the link point comparator issues a coincident result, related information to the user terminal.

In such a configuration, even if a moving image linkage is performed to the complicated screen such as a movie, the related information can be transmitted to a user terminal when the coordinate of an image recognized by the image recognizer matches the coordinate of a link point detected by the link point detector. This allows the link information for each time or each shape necessary for the related information to be reduced.

Furthermore, in the above-described internet moving image linking system, the server comprises means for continuing, when the link point comparator does not issue a coincident result, to reproduce a moving image by the user terminal.

In such a configuration, when the coordinate of an image recognized by the image recognizer matches the coordinate of a link point detected by the link point detector, a user can re-designate the point.

Moreover, another aspect of the present invention relates to a link recognition method suitable for use in an internet moving image linking system comprising a server and a user terminal. The server performs the steps of distributing a moving image to the user terminal and recognizing a link destination based on point time information and point coordinate information each transmitted from the user terminal.

In the method of the present invention, the link destination recognizing step comprises the steps of detecting, based on point time information transmitted from the user terminal, a static image at a corresponding time; recognizing an image based on point coordinate information transmitted from the user terminal and based on the detected static image; detecting a link point at a point time based on point time information transmitted from the user terminal and stored link point information; comparing the coordinate of the recognized image with the coordinate of the detected link point; transmitting, when a coincident result is issued, related information to the user terminal; and continuing, when a coincident result is not issued, to reproduce a moving image by the user terminal.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
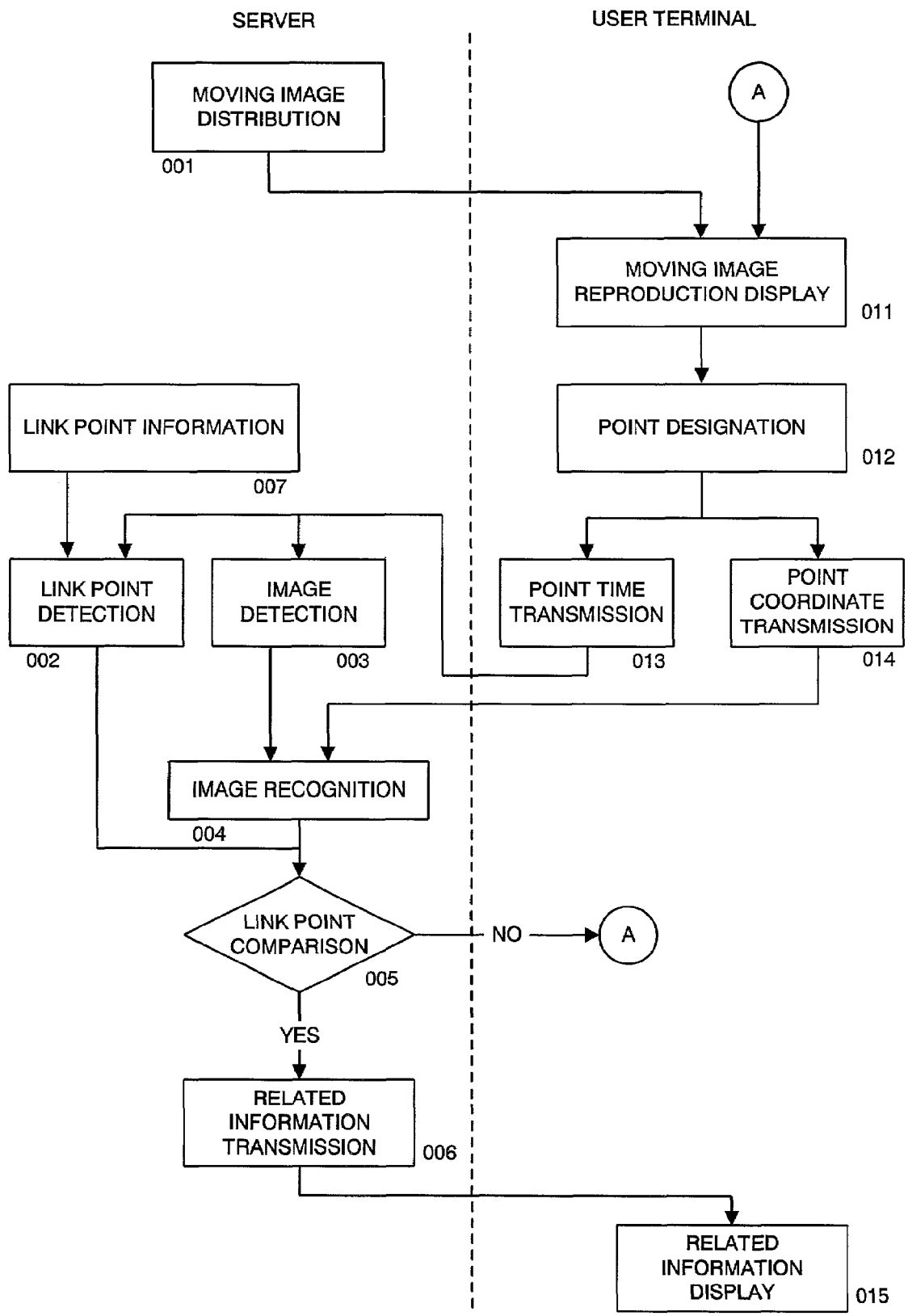
FIG. 1 is a block diagram illustrating the configuration of an internet moving image linking system according to the present invention.

An internet moving image linking system according to a first embodiment of the present invention will be described below by referring to the attached drawings.

According to the first embodiment of the present invention, the internet moving image link system consists of a server and a user terminal. The server has means for judging the presence or absence of a link designation based on point time information and point coordinate information transmitted from the user terminal.

The server consists of information equipment such as a workstation or a server. The server has means for judging the presence or absence of a link destination based on point time information and point coordinate information transmitted from the user terminal.

The user terminal, or a terminal utilized by a user, has means for accessing a WWW (World Wide Web) Browser accessible to a home page. The server is preferably connected to the user network via a network. The network is, for example, the Internet. The user terminal specifically is a terminal, including a personal computer, a portable telephone, or a mobile computer, connectable to a network such as the Internet.

Each of the point time information and the point coordinate information is information transmitted from the user terminal to the server. By clicking the screen of the user terminal by means of, for example, a mouse, the user can designate the point time information and the point coordinate information. The point time information corresponds to the time at which a user has clicked the screen using a mouse. The point coordinate information corresponds to the position on the screen at which a user has clicked the user terminal using the mouse.

The server has means for judging the presence or absence of a link destination based on the point time information and the point coordinate information. Since a specific time and a specific coordinate position designated by a user are respectively recognized in accordance with the point time information and the point coordinate information, it is judged whether or not a link destination is at the time and on the position. In the case of the presence of a link destination, the server transmits the information related to the link destination to the user terminal. In the case of the absence of a link destination, the server does not transmit the information related to the link destination to the user terminal.

As described above, since the server judges the presence or absence of a link destination based on the point time information and the point coordinate information transmitted from the user terminal, it is not necessary to store link information about all point times and all point coordinates. Therefore, no information is required for each time. The volume of information to be stored can be reduced. Even if a moving image linkage is performed to a complex screen such as a movie, the link information for each time and each shape necessary for the link information can be reduced.

Next, the internet time-varying image link system according to a second embodiment of the present invention will be described below.

In the second embodiment, the internet moving image linking system consists of a server and a user terminal. The server has a moving image distributor for distributing moving images to the user terminal and a link destination recognizer for recognizing a link destination based on point time information and point coordinate information transmitted from the user terminal.

The server, the user terminal, the point time information, and the point coordinate information have been already described in the first embodiment. The server has means for distributing moving images to the user terminal. The use of the moving-image distributing means allows moving images to be displayed on the screen of the user terminal. While watching a moving image on the screen of the user terminal, a user can specify a point by clicking it by means of a mouse.

Moreover, the server has a link destination recognizer that recognizes a link destination based on point time information and point coordinate information transmitted from the user terminal. When the link destination recognizer judges that there is the link destination, the information related thereto is transmitted to the user terminal. When the link destination recognizer judges that there is no link destination, the related information is not transmitted to the user terminal.

The server, which has the moving image distributor and the link destination recognizer, does not require to store link information regarding all point times and all point positions. Hence, no information is required for each time and the volume of information to be stored can be reduced. Even when a moving-image linkage is established to a complicated screen such as a movie, the link information necessary for each time and each shape can be reduced.

Next, an internet moving image link system according to a third embodiment of the present invention will be described below by referring to FIG. 1.

FIG. 1 is a diagram illustrating the configuration of the internet moving image linking system of the present invention. Referring to FIG. 1, the internet moving image linking system consists of a server and a user terminal. The server has a moving image distributor 001 for distributing moving images to the user terminal, an image detector 003 for detecting a static image at a corresponding time based on point time information transmitted from the user terminal, and an image recognizer 004 for recognizing images based on the point coordinate information transmitted from the user terminal and based on the static image detected by the image detector.

The server, the user terminal, the point time information, and the point coordinate information have been previously described in the first embodiment. The image detector 003 corresponds to a detector that detects a static image at a corresponding time based on point time information transmitted from the user terminal. That is, the image detector 003 is means for detecting a static image of a moving image at the time a user has clicked the moving image displayed on the screen of the user terminal suing a mouse.

The user terminal includes a moving image reproducer 011 for reproducing moving images transmitted from the server, a point designator 012 for designating a specific point within a moving image, a point coordinate information transmitter 013 for transmitting point coordinate information designated by the point designator to the server, and a point time information transmitter 014 for transmitting, to the server, point time information regarding a point designated by the point designator.

The image recognizer 004 corresponds to means for recognizing the image based on the point coordinate information transmitted from the user terminal and based on the static image detected by the image detector. That is, the image recognizer 003 reproduces the static image at the time a user has clicked a moving image with a mouse and recognizes it based on the point designated coordinate and based on the detected static image. Thus, the image detector 003 can recognize a specific portion of the image designated by the user.

As described above, because the server has the moving image distributor, the image detector, and the image recognizer, it is unnecessary to store link information on all point times and link information on all point coordinates. Therefore, information for each time is not required and the volume of information to be stored can be reduced. Even when complicated screen such as a movie is subjected to a moving image linkage, the link information necessary for each time and each shape can be reduced.

In the internet moving image linking system of the third embodiment, the server has a link point storage for storing link point information 007, a link point detector 002 for detecting a link point at the point time based on point time information and point coordinate information transmitted from the user terminal, and a link point comparator for comparing the coordinate of an image recognized by the image recognizer 004 with the coordinate of a link point detected by the link point detector 002.

The link point information corresponds to the related information of a link destination stored every time an operation in a moving image abruptly changes. When a moving image does not abruptly change, or operates linearly, the related information is not stored as link point information. In such a case, the related information is interpolated as follows.

The link point coordinate (x3, y3) at a point designated time can be calculated by the following formulas.

$$\Delta t = t3 - t1$$

$$x3 = x1 + (x2 - x1)\Delta t / (t2 - t1)$$

$$y3 = y1 + (y2 - y1)\Delta t / (t2 - t1)$$

where t1 is the time contained in the link point information; t2 is the time contained in the link point information; (x1, y1) is the coordinate corresponding to the time t1; and (x2, y2) is the coordinate corresponding to the time t2; and t3 is a point designated time between the time t1 and the time t2.

The link point detector is means for detecting a link point at the time a user has clicked a moving image using a mouse, the link point being obtained based on the point time information. The link point comparator (005) (to be described later) compares the link point detected by the link point detector.

The link point comparator 005 compares the coordinate of an image recognized by the image recognizer 004 with the coordinate of a link point detected by the link point detector 002. In other words, the link point comparator 005 compares whether or not a link point is within an image.

When the link point comparator 005 issues a coincident comparison result, or when the link point is within an image, the server has means 015 for transmitting the related information about a link destination to the user terminal. When the link point comparator 005 does not issue a coincident comparison result, the server has means for continuously reproducing a moving image to the user terminal.

Next, the internet moving image link system will be described below by referring to FIG. 2. FIG. 2 is a diagram illustrating the operation of an internet moving image link system according to the present invention.

Figure 2A:
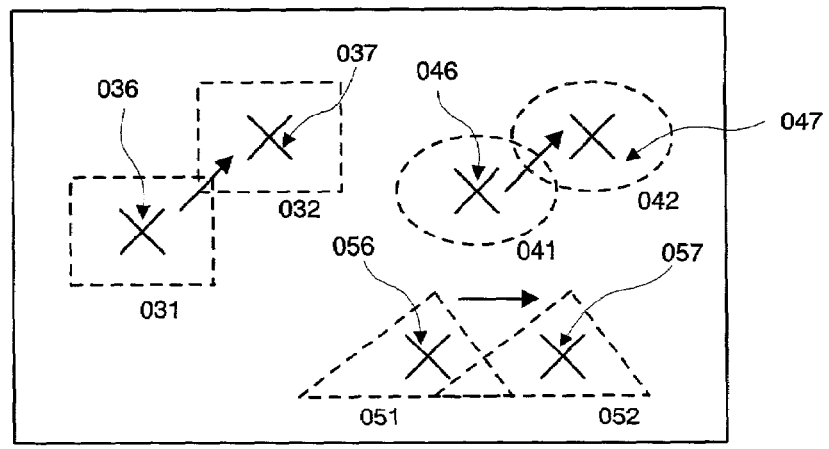
FIGS. 2A, 2B and 2C are diagrams each illustrating the operation of an internet moving image linking system according to the present invention.

As shown in FIG. 2A, moving images 031, 041, and 051 respectively move to the images 032, 042, and 052 after a lapse of a certain time. In this case, the link information contains time information, the coordinate information 036 of the image 031, the coordinate information 037 of the image 032, and the related information of the images 031 and 032. The link information further contains the coordinate information 046 of the image 041, the coordinate information 047 of the image 042, and the related information of the images 041 and 042. The link information further contains the coordinate information 056 of the image 051, the coordinate information 057 of the image 052, and the related information of the images 051 and 052.

Figure 2B:
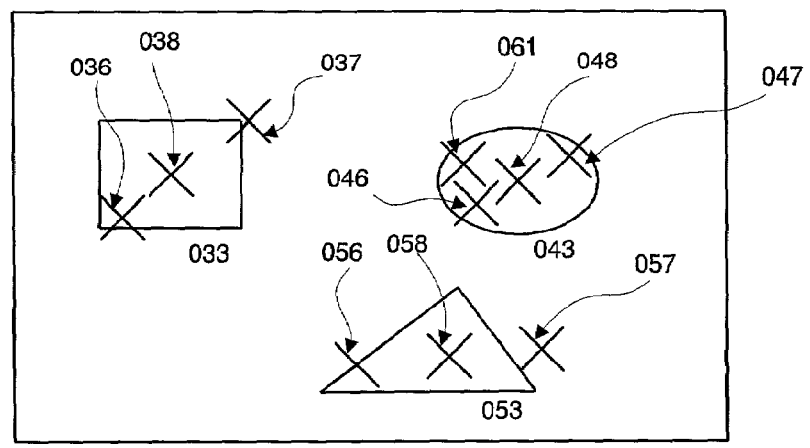

As shown in FIG. 2B, when a user utilizes the point 061 while an image is moving, the point time information and the point coordinate information are sent to the server. The server creates static images 033, 043, and 053 corresponding to the time based on the point time information transmitted from the user terminal. The server derives information about the link point 036 and information about the link point 037 from the point time information and works out the link point information through the interpolation computation. Similarly, the server works out the link point 048 based on the time information and the link points 046 and 047 and works out the link point 058 based on the time information and the link points 056 and 057.

Figure 2C:
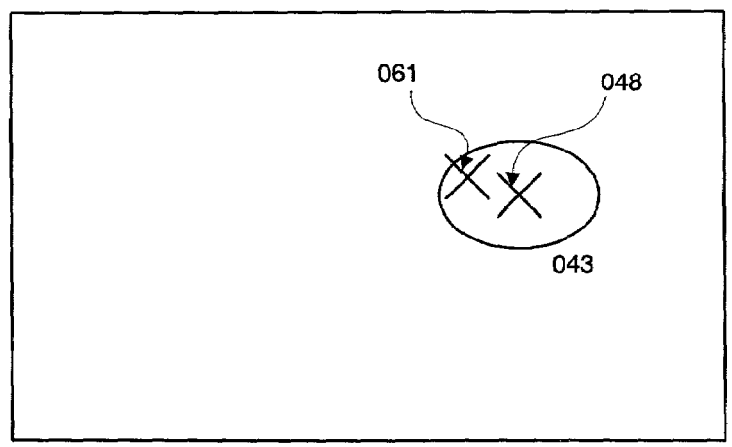

Next, as shown in FIG. 2C, image recognition is carried out with reference to the point 061, which is designated by the user through the user terminal, so that the image 043 is extracted. Comparison is made on whether or not respective link points are within the image 043. Since the link point 048 is within the image 043, information related to the link point 048 is transmitted to the user terminal.

On the other hand, when no link point exists in the link point 048, the user terminal continues the moving image reproduction without transmitting the related information.

As described above, according to the present invention, the internet moving image linking system can reduce the volume of the link information necessary for the related information in the moving image linkage.

The entire disclosure of Japanese Application No. 2001-003101 filed Jan. 10, 2001 including specification, claims, drawings and summary are incorporated herein by reference in its entirely.

What is claimed is:

1. An internet moving image linking system comprising:
   a server; and
   a user terminal;
   wherein said server comprises:
      a moving image distributor for distributing a moving image to said user terminal;
      an image detector for detecting a static image at a corresponding time based on point time information transmitted from said user terminal; and
      an image recognizer for recognizing a specific portion of an image designated by said user based on point coordinate information transmitted from said user terminal and based on said static image detected by said image detector,
      a link point storage for storing link point information;
      a link point detector for detecting a link point at a point time based on point time information and link point information transmitted from said user terminal; and
      a link point comparator for comparing the coordinate of an image recognized by said image recognizer with the coordinate of a link point detected by said link point detector, and
   wherein said linking point storage only stores a link destination for every point designating abrupt change in a movement of a specific portion of an image.

2. The internet moving image linking system defined in claim 1, wherein when the specific portion of the image is moving linearly, the link point detector interpolates a link destination for said specific portion of the image.

3. The internet moving image linking system defined in claim 2, wherein the link point detector calculates all link destinations for the point time information provided by said user based on relative movement of specific portions of the image.

4. The internet moving image linking system defined in claim 3, wherein each said relative movement is calculated based on the link destination of a previous point designating the abrupt change in the movement of the specific portion of the image and the link destination of a next point designating the abrupt change in the movement of the specific portion of the image and wherein the point time information received from the user terminal is between a point time information of the previous point and a point time information of the next point.

5. The internet moving image linking system defined in claim 4, wherein the link point comparator compares the calculated link destinations of the image with the recognized specific portion of the image designated by said user.

6. The internet moving image linking system defined in claim 1, wherein the abrupt change in a movement of a specific portion of an image is substantially non-linear movement of the specific portion of the image.

* * * * *